US012778171B2

(12) United States Patent
De Godoy et al.

(10) Patent No.: US 12,778,171 B2
(45) Date of Patent: Nov. 3, 2026

(54) BAKE-STABLE FILLING COMPOSITION

(71) Applicant: CARGILL, INCORPORATED, Wayzata, MN (US)

(72) Inventors: Silmara Franco De Godoy, Campinas (BR); Jurandir Jose Goncalves, Sorocaba (BR)

(73) Assignee: Cargill, Incorporated, Wayzata, MN (US)

( * ) Notice: Subject to any disclaimer, the term of this patent is extended or adjusted under 35 U.S.C. 154(b) by 259 days.

(21) Appl. No.: 18/263,429

(22) PCT Filed: Jan. 31, 2022

(86) PCT No.: PCT/US2022/014477
§ 371 (c)(1),
(2) Date: Jul. 28, 2023

(87) PCT Pub. No.: WO2022/165292
PCT Pub. Date: Aug. 4, 2022

(65) Prior Publication Data

US 2024/0108041 A1 Apr. 4, 2024

(30) Foreign Application Priority Data

Feb. 1, 2021 (EP) .................................... 21154509

(51) Int. Cl.

| | |
|---|---|
| ***A23L 27/30*** | (2016.01) |
| ***A21D 13/38*** | (2017.01) |
| ***A23C 9/154*** | (2006.01) |
| ***A23C 13/12*** | (2006.01) |
| ***A23C 13/14*** | (2006.01) |
| ***A23C 19/086*** | (2006.01) |

(52) U.S. Cl.
CPC .............. *A23L 27/34* (2016.08); *A21D 13/38* (2017.01); *A23C 9/1544* (2013.01); *A23C 13/125* (2013.01); *A23C 13/14* (2013.01); *A23C 19/086* (2013.01); *A23V 2200/18* (2013.01); *A23V 2250/5036* (2013.01); *A23V 2250/51084* (2013.01); *A23V 2250/624* (2013.01)

(58) Field of Classification Search
None
See application file for complete search history.

(56) References Cited

U.S. PATENT DOCUMENTS

| | | | | |
|---|---|---|---|---|
| 6,322,829 | B1 * | 11/2001 | McGlynn ............. | A23C 19/093 426/549 |
| 6,905,719 | B2 | 6/2005 | Wang et al. | |
| 7,452,564 | B2 | 11/2008 | Jindra | |
| 10,264,804 | B2 | 4/2019 | Vemulapalli et al. | |
| 2004/0202764 | A1 | 10/2004 | Jindra et al. | |

FOREIGN PATENT DOCUMENTS

| | | | |
|---|---|---|---|
| CN | 103220913 | A | 7/2013 |
| EP | 0372596 | A2 | 6/1990 |
| EP | 0750843 | A2 | 1/1997 |
| WO | 96/40794 | A1 | 12/1996 |

* cited by examiner

*Primary Examiner* — Lien T Tran

(57) ABSTRACT

The present invention relates to a filling composition comprising an aqueous phase comprising water, glycerin and sorbitol, and a fat phase, wherein the filling composition further comprises of a dairy powder, whey and starch. The invention also relates to a method for preparing such a filling composition. When used in a baked product, this filling composition has little or no oil leaking, little or no spread and low water activity. At the same time, the filling composition is creamy and flavorful.

14 Claims, No Drawings

BAKE-STABLE FILLING COMPOSITION

CROSS REFERENCE TO RELATED APPLICATIONS

This application is a national phase application of PCT Application No. PCT/US2022/014477, filed Jan. 31, 2022, which claims the benefit of European Application No. 21154509.0, filed Feb. 1, 2021, each of which are incorporated by reference herein in its entirety.

FIELD OF THE INVENTION

The present invention relates to a filling composition. Such fillings are typically used in baked dough products having a baked and crispy exterior casing and a creamy, soft filling. In this type of products, the filling should not negatively influence the texture of the exterior casing, e.g. crispiness, preferably also after an extended period of storage. The invention also relates to a method for preparing a filling composition.

There are several technical requirements for filling compositions. As in any filling, the water activity (Aw) is preferably low, i.e. below 0.65, ensuring microbiological and textural stability. At the same time, a low Aw should not lead to a deterioration of other characteristics of the filling. In particular, it is important that no oil leakage occurs when the product containing the filling is baked. Also, preferably there is little or no leak of the filling outside the baked product, immediately after baking. Further, the flavor and mouthfeel after baking are important. It is preferred that the filling is creamy and has a pleasant flavor, e.g. a cheese savory flavor, that is appreciated by the consumer.

In general, it is difficult to provide a filling composition that fulfills all the requirements presented above, i.e. that has little or no oil leakage, little or no spread and low water activity while at the same time being creamy and flavorful. Furthermore, such a filling composition should be able to be produced on an industrial scale.

U.S. Pat. No. 7,452,564 describes a bake-stable filling with a low water activity that is based on a matrix including a whey protein with a dispersion of oil in glycerin. The savory fillings exemplified contain 27% glycerin and 8% whey protein. Although this filling seems reasonable in certain aspects, it's creaminess and taste can be improved. Also producing such filling on an industrial scale represents a major challenge.

STATEMENTS OF THE INVENTION

The present invention provides in a first aspect a filling composition comprising

- an aqueous phase comprising water, 1 to 15 wt. % glycerin and 15 to 30 wt. % sorbitol, and
- a fat phase
- wherein said filling composition further comprises 15 to 25 wt. % of a dairy powder, selected from cheese powder, cream powder or a combination thereof, 2 to 10 wt. % whey and 1 to 6 wt. % starch, the wt. % being based on the total weight of the filling composition.

In a second aspect, the invention relates to a method for preparing a filling composition. In a third aspect, the invention relates to a food product containing the filling composition of the invention.

DETAILED DESCRIPTION

Filling Composition

The present invention provides a filling composition that is improved over the existing filling compositions. The filling composition of the invention may have one or more of the following benefits: little or no oil leakage, little or no spread and low water activity. Said filling is also creamy and flavorful.

The filling is preferably a savory filling. With savory is meant that the filling has a spicy or salty quality without sweetness. Savory fillings contain little or no sweetener. The fact that the filling contains little sweetener (sugar) makes it more difficult to achieve the desired low Aw, since sugar can act as a solute that lowers the Aw.

Thus, the filling composition of the invention contains less than 5 wt. %, preferably less than 3 wt. %, more preferably less than 1 wt. %, or even 0 wt. % sweetener. "Sweetener" as used herein refers to any type of sweetener or sweetener-containing formulation which is suitable for use in food. Non-limiting examples of sweeteners include monosaccharides, such as glucose, dextrose, fructose, allulose or galactose; disaccharides such as sucrose (also called saccharose), lactose or maltose; polyols such as sorbitol, mannitol, maltitol, xylitol, erythritol, or isomalt; high intensity sweeteners, such as Stevia® (with steviol glycosides as active compounds); honey, agave syrup, maple syrup, and combinations of two or more thereof.

Preferably, the composition of the invention contains less than 5 wt. %, preferably less than 3 wt. %, more preferably less than 1 wt. %, or even 0 wt. % sucrose. "Sucrose" as used herein refers to sucrose in various forms including but not limited to standard (e.g. granulated or crystalline) table sugar, powdered sugar, caster sugar, icing sugar, sugar syrup, silk sugar, unrefined sugar, raw sugar cane, and molasses.

A further advantage of the invention is that the filling composition is bake-stable. With "bake-stable" is meant that the filling composition is stable against oil leakage when used in a dough product that is baked, i.e. at temperature starting from room temperature (20° C.) prior to baking to 150-250° C. during baking. Further, after baking it should not negatively influence the properties of the dough, e.g. the crispiness of the dough. As described hereafter, bake stability is tested by baking a filling in an oven, test which includes: drawing a circle with a diameter of 7.5 cm on baking paper, adding 32 g of filling in the circle and spreading the filling evenly within the limits of the circle, baking the filling for 5 minutes in the oven at 204° C. and visually inspecting the result after baking, whereby oil leakage is observed as an oil stain on the paper outside the circle and spreading is observed as migration of the baked filling outside the circle—the larger the stain, the higher the oil quantity leaking out of the filling.

As described above, water activity is a factor influencing microbiological and textural stability of the final dough product. The water activity is measured by equilibrating a product in a sealed container and then measuring the relative humidity of the headspace. Too high a water activity will cause the dough product to loose crispiness and texture. The filling composition of the invention preferably has a water activity of less than 0.65. This water activity is achieved by the right balance of ingredients in the filling composition such as glycerin, sorbitol, fat, cheese powder, whey and water.

As described above the filling composition of the invention comprises an aqueous phase and a fat phase. The aqueous phase and fat phase are preferably in the form of an emulsion in the filling composition. The filling composition preferably further contains an emulsifier to help create and stabilize the emulsion. Emulsifiers known in the art for food applications can be used such as DATEM emulsifiers, diacetyl tartaric acid esters of mono- and diglycerides of fatty acids, lecithin, emulsifying particles or emulsifying fibers (e.g. citrus fibers). The amount of emulsifiers may be from 0.05 to 0.5 wt. %.

It is preferred that the filling has a pH below 6, e.g. from 4 to 6. Any acid suitable for food applications, e.g. lactic acid or citric acid, can be used in necessary quantities to achieve the desired pH.

Aqueous Phase

As described above, the aqueous phase comprises 1 to 15 wt. % glycerin and 15 to 30 wt. % sorbitol. By combining both glycerin and sorbitol in the amounts described, a filling composition is obtained that has a good taste (little bitterness) and is creamy, while the water activity is still within the desired range, i.e. lower than 0.65.

Preferably, the amount of glycerin is 6 to 9 wt. %. Preferably the amount of sorbitol is 18 to 28 wt. %, based on the total weight of the filling composition. Most preferably, the amount of glycerin is 6 to 9 wt. % and the amount of sorbitol is 18 to 28 wt. %, based on the total weight of the filling composition.

The aqueous phase further contains water. Preferably, the total amount of water in the filling composition is at most 30 wt %, more preferably at most 15 wt %, even more preferably at most 8 wt. %, most preferably at most 6 wt. %. The water content is preferably at least 2 wt. %, preferably at least 4 wt. %.

Preferably, the aqueous phase further comprises 0.5 to 2.0 wt. %, more preferably 1.0 to 2.0 wt. %, microcrystalline cellulose (MCC). The presence of MCC together with whey, allows to build a network in the emulsion that incorporates the fat phase. The aqueous phase may further comprise one or more hydrocolloids to create further texture, e.g. citrus fibers, xanthan, locust bean gum, alginate, gellan gum and carrageenan, preferably carrageenan. The amount of hydrocolloids is from 0.05 to 0.5 wt. % based on the total weight of the filling composition.

Preferably, the aqueous phase comprises (i) 1 to 15 wt. % glycerin, (ii) 15 to 30 wt. % sorbitol, (iii) at most 8 wt. % water, (iv) between 0.5 and 2.0 wt. % of MCC and optionally a hydrocolloid chosen from the group consisting of citrus fibers, xanthan, locust bean gum, alginate, gellan gum and carrageenan. Preferred ranges and options are presented hereinabove and will not be repeated herein.

Fat Phase

As described above, the filling composition comprises a fat phase. The fat phase may comprise shortenings, oils and mixtures thereof, known in the art. If fats and oils are used to form the fat phase, these are preferably natural, hydrogenated or partially hydrogenated fats and oils. As a fat source, soy, canola, peanut, sunflower, corn, coconut, palm, palm kernel, olive, tallow, lard or dairy butter fat can be used. Preferably, the fat phase contains an oil obtained from a vegetable source, preferred vegetable sources including soy, canola, peanut, sunflower, corn, coconut, palm, palm kernel and olive.

The fat phase is preferably present in the filing of the present invention in an amount from 15 to 35 wt. %, preferably from 20 to 30 wt. % based on the total weight of the filling composition.

Solids

Beside the aqueous phase and fat phase, preferably as an emulsion, the filling composition further comprises a dairy powder, whey and starch.

The dairy powder can be a cheese powder, a cream powder, or a combination of both. The dairy powder provides the savory flavor and aids the mouthfeel The dairy powder comprises 15 to 25 wt. % of the total filling composition, preferably 20 to 23 wt. %.

Preferably, the dairy powder is a cheese powder. Cheese powder may be a commercially available cheese product preferably having a high fat content, in particular from 30 to 65 wt. % of the weight of the cheese powder. It can also be dehydrated cheese and have for instance a parmesan, cheddar or mozzarella flavor.

Cream powder refers to a commercially available dehydrated dairy product with a high fat content, typically from 40 to 60 wt. % of the weight of the dairy powder. When a cream powder is used, it is preferably combined with maltodextrin in order to achieve sufficient texture.

Further flavoring agents can be added, such as cheese flavor, for instance provolone flavor or mozzarella flavor, and ham flavor, herb flavor or garlic flavor or combinations thereof. In case a flavoring agent is used, preferably, its amount is between 0.01 and 10 wt %, A further component of the filling composition is whey in an amount of 2 to 10 wt. %. Whey products may contain different amounts of protein. The above amounts are based on a whey product containing 80% protein. Thus the filling composition comprises 1.6 to 8 wt. % whey protein.

The addition of whey may provide stability to the emulsion, which can be further improved when combined with microcrystalline cellulose. However, the amount of whey should not be too high since it may negatively influence the creaminess of the filling composition. Preferably, the filling composition comprises 4 to 7 wt. % whey.

The filling composition also contains 1 to 6 wt. % starch. The addition of starch is important to prevent spreading of the filling composition. References to starch in this description are meant to include their corresponding flours. All starches may be suitable for use herein and may be derived from any native source. The native source can be corn, pea, potato, wheat, tapioca and waxy or high amylose varieties thereof. A used herein, the term “waxy” is intended to include a starch or flour containing at least about 95% by weight amylopectin and the term “high amylose” is intended to include a starch or flour containing at least about 40% by weight amylose.

The starches can be modified starches including physically, enzymatically and chemically modified starches. Physically modified starches include thermally inhibited starches such as described in WO96040794.

Chemically modified starches include cross-linked starches, acetylated and organically esterified starches, hydroxyethylated and hydroxypropylated starches, phosphorylated and inorganically esterified starches, cationic, anionic, nonionic, and zwitterionic starches, thinned starches (such as acid and enzymatic thinned starches), and succinate and substituted succinate derivatives of starches. Such modifications are known in the art, for example in Modified Starches: Properties and Uses, Ed. Wurzburg, CRC Press, Inc., Florida (1986).

Preferably, the starch is selected from native starch, modified starch and mixtures thereof, more preferably one or more hydroxypropylated starches.

Preferably, the filling composition of the present invention comprises:

2 to 8 wt. %, preferably 4 to 6 wt. % water 1 to 15 wt. %, preferably 6 to 9 wt. % glycerin 15 to 30 wt. %, preferably 18 to 28 wt. % sorbitol, 15 to 35 wt. %, preferably 20 to 30 wt. % of a fat phase 15 to 25 wt. %, preferably 20 to 23 wt. % of a dairy powder
2 to 10 wt. %, preferably 4 to 7 wt. % whey
1 to 6 wt. % starch,
optionally 0.01 to 10 wt. % flavoring agent
optionally 0.05 to 5 wt. % hydrocolloids
optionally 0.5 to 2.0 wt. % microcrystalline cellulose
optionally 0.05 to 2 wt. % emulsifier
the wt. % being based on the total weight of the filling composition Process According to a second aspect, the invention relates to a method for preparing a filling composition, comprising the steps of (a) mixing glycerin, sorbitol and water to obtain an aqueous phase;
(b) adding a liquid fat phase to the aqueous phase;
(c) mixing the aqueous phase and the fat phase, preferably in the presence of an emulsifier, to obtain an emulsion;
(d) adding cheese powder, whey and starch to the emulsion;
(e) optionally adjusting the pH of the emulsion to a value smaller than 6.

In step (a) glycerin, sorbitol and water are mixed. In this step preferably also microcrystalline cellulose is be added. Optionally also other hydrocolloids, preferably carrageenan can be added. These components are preferably mixed for sufficient time to hydrate the MCC.

In step (b) a liquid fat phase is added to the water phase under agitation, to obtain an emulsion in step (c). It is preferred to add the fat phase sufficiently slow so as not to provoke separation of the phases. This can be easily determined by a person skilled in the art.

Further, an emulsifier can be added to the aqueous phase or fat phase, preferably to the fat phase together with the liquid fat.

In step (d) cheese powder, whey and starch are added to the emulsion together with other optional ingredients such as cheese flavor and salt (sodium chloride).

In step (e) the pH of the emulsion is preferably adjusted by the addition of an acid, to a value smaller than 6, preferably to a value from 4 to 6. As the acid, a food grade acid is used, such as lactic acid.

In particular, the steps of the method are carried out such that a filling composition is obtained which comprises 1 to 15 wt. %, preferably 6 to 9 wt. % glycerin, 15 to 30 wt. %, preferably 18 to 28 wt. % sorbitol, 15 to 25 wt. %, preferably 20 to 23 wt. % cheese powder, 2 to 10 wt. %, preferably 4 to 7 wt. % whey and 1 to 6 wt. % starch Microcrystalline cellulose is added in an amount of 0.5 to 2 wt. %, preferably 1.0 to 2 wt. % based on the filling composition obtained.

Food Product

The present invention also relates to a food product containing the filling composition of the invention. In particular the food product is a dough product which contains the filling composition as an interior filling. The filling composition can be injected into a dough product, or a dough product can be wrapped around the filling. Examples are crackers, biscuits, pastries, pretzels and crisps. The filling composition can also be used as a topping on a dough product.

The dough product can be formed on conventional equipment, including laminators, extruders, depositors, rotary formers, wire cutters, and the like. Once the dough preform is formed, the filling composition of the invention can be applied onto or into a dough preform in any manner suitable. The filling composition can be injected into the dough product, co-extruded with the dough product, disposed between sheets of the dough product, or otherwise applied to the dough product The resulting composite dough product can be baked or otherwise cooked, e.g., fried, extruder heated, drum heated, or the like.

The invention enables the baking of the dough product to a crisp texture without degrading the filling composition to an extent that oil leaks to the baked exterior. The filling composition will also not adversely affect the texture of the baked dough product. The filling composition can also be added to a baked food product after the dough has been partially or fully baked.

The food product of the invention can be a baked product, or a semi-finished pre-baked product.

The term "dough" as used in this context includes all formulations that the person skilled in the art would consider dough. At a minimum, these formulations contain a starch component and at least sufficient water to hydrate the starch, both being employed in reasonable proportions. The starch component can be provided as whole grain or grain ground or refined to any desired degree. It can be supplied in the form of flour, e.g., from wheat, barley, corn, oats, rice, rye, and the like. Or the starch component can be supplied as a purified or mechanically refined or less than whole grain flour. The water can comprise water itself or an aqueous liquid such as milk (whole, skim, buttermilk, soy), fruit or vegetable juice, and the like. Yeast or chemical leavenings are also typically present.

Generally, the dough will also contain shortening in an amount suitable for achieving the textural characteristics desired for a given type of product. All conventional ingredients, typical for desired recipes, can be employed.

EXAMPLES

The following ingredients were used:
Glycerin obtained from Cargill
Liquid sorbitol obtained from Tradal
Microcrystalline cellulose from JRS
Carrageenan gum, Satiagel ADF 23 from Cargill
Corn oil from Cargill
Emulsifier DATEM Mycelle DT 815 from Cargill
Cheese powder from Kerry
Cheese flavor from IFF
Whey, (80% protein content) from Arla Foods
Modified Starch Polartex 06730 from Cargill—a hydroxypropylated modified starch
Modified Starch Cream Tex 06329 from Cargill—a hydroxypropylated modified starch
Maize starch Amilogill 2100 from Cargill General Methods Using a high speed mixer, glycerin, sorbitol and water were mixed for 10 min. During these 10 min, microcrystalline cellulose was dispersed in glycerin, sorbitol and water. While maintaining a good vortex, emulsifier and liquid oil, were added slowly and mixed for 1 minute after all the oil was added. Then salt, whey protein, cheese powder and starch were added and mixed at low speed. Finally acid was added.

Oven Procedure to Evaluate Bake Stability:

1) Make a circle of 7.5 cm diameter with a pen on a baking paper
2) Weigh 32 g of filling and put inside the circle and spread the filling respecting the limits of the circle.
3) Bake the filling for 5 minutes at 204° C. in a preheated oven.

Evaluation of Hardness:

Method to measure hardness of margarine, Probe P/25. Equipment: TA.XT Plus

Evaluation of Water Activity:

Using an AquaLab Series 4TEV, the water activity (free water) in the product was analysed through the dew point.

Examples

Example 1

An emulsion 1 was prepared from the following ingredients:

| Ingredients | % | g |
|---|---|---|
| Glycerin | 12.25% | 183.75 |
| Liquid sorbitol | 35.37% | 530.55 |
| Water | 8.50% | 127.50 |
| Microcrystaline Cellulose MCC | 1.85% | 27.75 |
| Carrageenan gum Satiagel ADF 23 | 0.30% | 4.50 |
| Corn oil | 41.52% | 622.80 |
| Emulsifier DATEM Mycelle DT 815 | 0.21% | 3.15 |
| Total | 100% | 1500 |

A filling composition was obtained by mixing the emulsion 1 according to the following table:

| Ingredients | % | G |
|---|---|---|
| Emulsion 1 | 65.00% | 585.00 |
| Cheese powder | 22.50% | 202.50 |
| Cheese Flavor | 2.50% | 22.50 |
| Whey | 5.00% | 45.00 |
| Modified Starch Polartex 06730 | 3.00% | 27.00 |
| Modified Starch CreamTex 06329 | 1.00% | 9.00 |
| Salt | 0.50% | 4.50 |
| Lactic acid | 0.50% | 4.50 |
| Total | 100% | 900 |

In the test for bake-stability, the filling showed no oil leakage and no spread. The taste is creamy. Aw is 0.63.

Example 2

An emulsion 2 was prepared from the following ingredients

| Ingredients | % | g |
|---|---|---|
| Glycerin | 12.70% | 183.75 |
| Liquid sorbitol | 36.65% | 530.55 |
| Water | 8.81% | 127.50 |
| Microcrystaline Cellulose MCC | 1.92% | 27.75 |
| Carrageenan gum Satiagel ADF 23 | 0.31% | 4.50 |
| Corn oil | 39.39% | 570 |
| Emulsifier DATEM Mycelle DT 815 | 0.22% | 3.15 |
| Total | 100% | 1500 |

A bake-stable filling composition was obtained by mixing the emulsion 2 according to the following table:

| Ingredients | % | g |
|---|---|---|
| Emulsion 2 | 60.40% | 470.00 |
| Cheese powder | 23.43% | 182.32 |
| Maltodextrin | 2.60% | 20.23 |
| Cheese Flavor | 2.00% | 15.56 |
| Whey | 5.78% | 44.98 |
| Modified Starch Polartex 06730 | 3.47% | 27.00 |
| Modified Starch CreamTex 06329 | 1.16% | 9.03 |
| Salt | 0.58% | 4.51 |
| Lactic acid | 0.58% | 4.51 |
| Total | 100 | 778.15 |

In the test for bake-stability, the filling showed no oil leakage and no spread. The taste is creamy. Aw is 0.63.

Comparative Example 1

An emulsion C (comparative) was prepared from the following ingredients

| Ingredients | % | g |
|---|---|---|
| Glycerin | 0 | 0 |
| Liquid sorbitol | 36.57% | 280.00 |
| Water | 10.04% | 76.87 |
| Microcrystaline Cellulose MCC | 1.10% | 8.42 |
| Shortening | 52.11% | 398.99 |
| Emulsifier DATEM Mycelle DT 815 | 0.18% | 1.38 |
| Total | 100% | 765.66 |

A filling composition was obtained by mixing the emulsion C according to the following table:

| Ingredients | % | g |
|---|---|---|
| Emulsion | 54.69% | 765.66 |
| Cheese powder | 20.76% | 290.64 |
| Maltodextrin | 11.70% | 163.80 |
| Whey | 8.00% | 112.00 |
| Maize starch Amilogill 2100 | 2.50% | 35.00 |
| Salt | 0.94% | 13.17 |
| Lactic acid | 0.50% | 7.00 |
| Cheese Flavor | 0.91% | 12.74 |
| Total | 100% | 1400 |

The comparative filling is bake-stable (no spread and no oil leakage after baking). It has a clean taste. The texture is not very creamy. The water activity is 0.67, which is higher than the desired 0.65.

Comparative Example 2

A filling composition was prepared as in U.S. Pat. No. 7,452,564 with the following composition:

| Ingredients | % |
|---|---|
| Glycerin | 27.00 |
| Cheese powder | 20.76 |
| Vegetable shortening | 16.00 |
| Maltodextrin | 11.70 |
| Whey | 8.00 |
| Water | 6.99 |
| Vegetable oil | 4.00 |
| Starch | 2.50 |

-continued

| Ingredients | % |
|---|---|
| Salt | 1.08 |
| Microcrystalline cellulose | 0.60 |
| Flavor | 0.50 |
| Acid | 0.50 |
| Color | 0.20 |
| Emulsifier | 0.10 |

The filling from Comparative Example 2 is bake stable and has a low water activity. However, the texture before and after baking is very poor in creaminess, having a hard texture.

Hardness of the filling was measured with the method described above and compared to Example 1.

| Example | Hardness before baking (g) | Hardness after baking (g) |
|---|---|---|
| 1 | 116 | 1708 |
| Comp. Ex. 2 | 375 | 7579 |

The invention claimed is:

1. A filling composition comprising an aqueous phase comprising water, 6 to 9 wt. % glycerin and 18 to 28 wt. % sorbitol, and a fat phase wherein said filling composition further comprises 15 to 25 wt. % of a dairy powder, selected from cheese powder, cream powder or a combination thereof, 2 to 10 wt. % whey and 1 to 6 wt. % starch, the wt. % being based on the total weight of the filling composition, wherein the aqueous phase and fat phase are in the form of an emulsion; wherein the filling composition further comprises an emulsifier in an amount from 0.05 to 0.5 wt. % based on the total weight of the filling composition; wherein the total amount of water in the filling composition is at most 8 wt. % based on the total weight of the filling composition; and wherein the filling composition contains less than 5 wt. % sucrose wherein the filling composition has a water activity of less than 0.65.

2. The filling composition according to claim 1, comprising 4 to 7 wt. % whey.

3. The filling composition according to claim 1, wherein the aqueous phase further comprises 0.5 to 2.0 wt. % microcrystalline cellulose.

4. The filling composition according to claim 1, wherein the aqueous phase further comprises one or more hydrocolloids.

5. The filling composition according to claim 1, wherein the fat phase comprises a vegetable oil.

6. The filling composition according to claim 1, wherein the filling composition comprises cheese powder.

7. A method for preparing a filling composition, comprising the steps of (a) mixing 6 to 9 wt. % glycerin, 18 to 28 wt. % sorbitol and water to obtain an aqueous phase;

(b) adding a liquid fat phase and 0.05 to 0.5 wt. % emulsifier, based on the total weight of the filling composition, to the aqueous phase;

(c) mixing the aqueous phase and the fat phase in the presence of the emulsifier to obtain an emulsion;

(d) adding cheese powder, whey and starch to the emulsion;

(e) optionally adjusting the pH of the emulsion to a value smaller than 6 and wherein the filling composition obtained has a total water content of at most 8 wt. % based on the total weight of the filling composition and contains less than 5 wt. % sucrose wherein the filling composition has a water activity of less than 0.65.

8. The method according to claim 7, wherein the steps are carried out such that the filling composition obtained further comprises 15 to 25 wt. % dairy powder, 2 to 10 wt. % whey and 1 to 6 wt. % starch; the wt. % being based on the total weight of the filling composition.

9. The method according to claim 7, wherein in step (a) further microcrystalline cellulose is mixed.

10. The method according to claim 9, wherein in step (a) further carrageenan is mixed.

11. The method according to claim 7, wherein in step (e) the pH is adjusted to a value from 4 to 6.

12. A food product containing the filling composition according to claim 1.

13. A food product containing a filling composition, wherein the filling composition is obtained according to the method of claim 7.

14. The filling composition according to claim 1, wherein the aqueous phase further comprises one or more hydrocolloids and the one or more hydrocolloids comprises carrageenan.

* * * * *